United States Patent [19]

Folkes

[11] 3,915,607

[45] Oct. 28, 1975

[54] METHOD AND APPARATUS FOR CURING ELONGATED ARTICLES

[75] Inventor: Hugh Lorain Folkes, St. Leonard's-on-Sea, England

[73] Assignee: Dunlop Limited, England

[22] Filed: July 31, 1973

[21] Appl. No.: 384,268

[30] Foreign Application Priority Data

Aug. 2, 1972 United Kingdom............ 36074/72

[52] U.S. Cl. .................. 425/411; 425/47; 425/338
[51] Int. Cl.² ....................... B29C 3/00; B28B 3/00
[58] Field of Search ............ 425/47, 335, 337, 338, 425/339, 406, 411, 450 C, 451

[56] References Cited
UNITED STATES PATENTS

| 2,027,165 | 1/1936 | Grubman | 425/411 X |
|---|---|---|---|
| 2,367,525 | 1/1945 | Rempel | 425/406 |
| 2,533,335 | 12/1950 | Wallace | 425/451 X |
| 3,779,684 | 12/1973 | Folkes | 425/406 X |
| 3,795,470 | 3/1974 | DeMets | 425/335 X |

Primary Examiner—Al Lawrence Smith
Assistant Examiner—James G. Smith
Attorney, Agent, or Firm—Stevens, Davis, Miller & Mosher

[57] ABSTRACT

A method of curing an elongated article, such as mechanical belting, by, and apparatus for, successively bringing first and second pluralities of plates into curing relationship with first and second surfaces of the article with platens adjacent the first surface staggered relative to those adjacent the second surface in the direction of the length of the article and secured to prevent separation, the article and platens being moved stepwise in the direction of the length of the article, and compressive forces being applied to the article while stationary.

11 Claims, 15 Drawing Figures

METHOD AND APPARATUS FOR CURING ELONGATED ARTICLES

This invention relates to a method and apparatus for the curing in a curing unit of elongated articles whose length is greater than that of the curing unit, and in particular to the curing of rubber and plastics mechanical belting and like elongated articles.

In the complete specification of the assignees British Pat. No. 1,175,521 there is described a method of curing an article comprising mounting the article in association with a curing press comprising a series of press units which may each comprise a pair of platens, successively engaging the press units with successive portions of the article, and moving the article and the press units in engagement therewith through the press while the press units apply pressure and heat to successive portions of the article, wherein the article and the press units in engagement therewith are moved through the press in a stepwise manner, and the pressure is initially applied to each portion of the article by its respective press unit while the article is stationary. We have also described therein a curing unit suitable for the manufacture of mechanical belting and like elongated articles by the aforementioned method.

One object of the present invention is to provide an improved curing unit and an improved method of curing elongated articles.

According to one aspect of the present invention a method of curing an elongated article comprises successively bringing a first plurality of platens individually into curing relationship with successive portions of a first surface of the article and successively bringing a second plurality of platens individually into curing relationship with a second surface of the article with the platens adjacent the first surface being staggered relative to those adjacent the second surface in the direction of the length of the article, securing together staggered platens of the first and second pluralities to prevent longitudinal separation of the platens, moving the article and platens in curing relationship therewith in a stepwise manner in the direction of the length of the article, and successively bringing the platens out of curing relationship with the article, wherein compressive forces are applied to successive portions of the article by the platens while the article and platens are stationary between successive stepwise movements.

During the application of compressive forces to successive portions of the article by the platens, platen clamping means may be brought into operative relationship with the platens to secure platens of the first and second pluralities of platens relative to each other.

The platens may be brought into curing relationship with the article at a pressing station and there secured in said curing relationship by clamping means arranged such that each platen adjacent one surface of the article may be secured to two successive platens adjacent a second surface of the article, and such that said platens adjacent the article are linked together in the direction of the length of the article.

If desired the temperature of successive platens may be raised while the platens are in curing relationship with the article to be cured by bringing a heated surface into engagement with the platens while the platens are stationary between successive stepwise movements.

According to a further aspect of the present invention a band of thin material is provided adjacent at least one surface of the article, between the article and a plurality of platens in curing relationship therewith.

Preferably the band of thin material is a band of plastics or metal, but alternatively it may be a band of any other suitable material capable of withstanding the curing temperatures.

The invention also provides an article and mechanical belting which have been cured by the use of the method according to the present invention.

According to another aspect of the present invention a curing press for curing elongated articles comprises platens to be brought into curing relationship with successive portions of two surfaces of an elongated article to be cured, with the platens adjacent a first surface staggered relative to those adjacent a second surface in the direction of the length of the article, means for detachably securing together the staggered platens to prevent longitudinal separation, stepwise transfer means arranged to move the article and a plurality of platens in curing relationship therewith in a stepwise manner in the direction of the length of the article, and means for causing the platens to apply compressive forces to successive portions of the article while stationary between successive stepwise movements.

According to a further aspect of the present invention a pressing station is provided to cause the platens to apply compressive forces to their respective portions of the article, and clamping means are provided to retain the platens relative to each other when the platens leave the pressing station.

Preferably the platen clamping means are arranged such that each platen adjacent a first surface of the article may be secured to two successive platens adjacent a second surface of the article. Thus, two successive platens adjacent one surface of the article may be secured together in the direction of the length of the article via an intermediate platen adjacent another surface of the article to ensure that a uniform tension is maintained in the article as the article and platens are moved in a stepwise manner through the curing unit. Ensuring a uniform tension has the particular advantage that, compared with curing units in which pairs of platens are vertically aligned and are linked together merely by the belt, the belt material is not stretched between platens and an improved belt finish is achieved. In addition, neighboring platens may be held firmly in abutting relationship such that no belt material can exude between neighboring platens and this also assists in achieving an improved belt finish.

The word "curing" as used in this specification in relation to articles of rubber refers to vulcanization of the rubber and in relation to plastics and other material relates to any process requiring the application of pressure and control of temperature to convert material in one form to another form, for example from a pasty or liquid form to a solid self-supporting form.

The present invention is applicable not only to curing units of the general kind described in the specification of the assignees British Pat. No. 1,175,521 but also, for example, to curing units of the kind described in the specification of its patent of addition, i.e., U.K. Patent of Addition No. 1,213,006.

Embodiments of the invention will now be described, by way of example, with reference to the accompanying drawings in which.

First and second identical curing presses 1, 2 (see FIG. 1) for the curing of mechanical belting comprises a plurality of upper 3a and lower platens 3b (see FIG. 2) extending between two stations in continuous head-to-tail relationship and in engagement with respective lengths of reinforced rubber conveyor belting.

The upper and lower platens are successively brought into alignment with a length of belting 4 at a position indicated by numeral 5 (see FIG. 1) and successively engaged with successive contiguous portions of the upper and lower surfaces respectively of the length of belting at a pressing station 25a, which constitutes a first station of the first curing press, in such a manner that the abutting ends of an upper platen lie substantially mid-way between the ends of a lower platen. From the first station the platens move along the press, in engagement with the belting, to a second station 25b at the other end of the first curing press where they are successively disengaged from the belting and transferred through a position indicated by numeral 7 to a pressing station 25c constituting a first station of the second curing press 2. Here the platens are successively engaged with successive contiguous portions of another length of belting 8, with the upper platens 3a staggered relative to the lower platens 3b, and moved in engagement with the belting to a second station 9 at the other end of the second curing unit where they are then successively disengaged from the belting and returned to the position indicated by numeral 5 to commence another identical sequence of operations.

Figure 2:
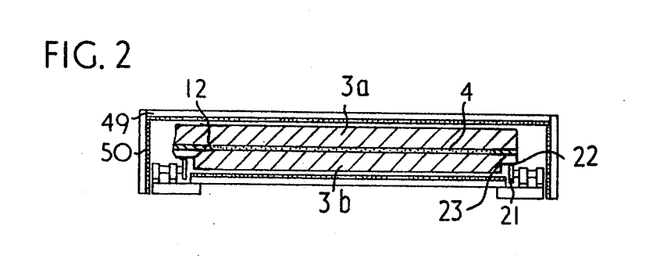
FIG. 2 shows a cross-sectional view taken on the line II—II of FIG. 1.

As shown in FIG. 2, each platen 3a, 3b is in the form of a thick metal plate for engagement with the belting 4, 8. Holding means in the form of a series of clamps (see FIG. 3) are provided to retain and prevent vertical separation of the upper and lower platens during a curing operation as the platens and belting pass between the first and second stations of the two curing presses 1, 2.

Figure 3:
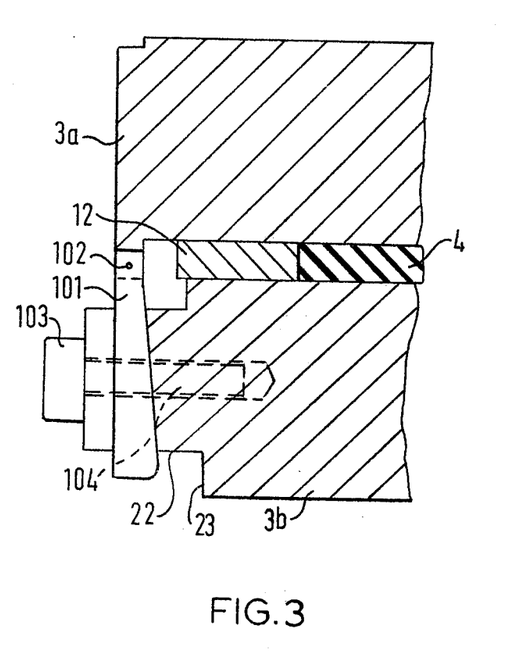
FIG. 3 shows a fragmentary cross-sectional view similar to that of FIG. 2, illustrating further details of a curing press.

Each upper platen 3a is provided with four hinged clamp plates 101 two on each side of each platen and positioned near to the ends of the platen. Each clamp plate 101 pivots about a hinge pin 102 located in the vicinity of the lower surface of the upper platen 3a with its axis extending parallel to the length of the article being cured. The two clamp plates 101 near one end of the upper platen are each secured to a first lower platen by fastening means in the form of a clamp screw 103 which screws into a screw-threaded hole 104 in a side of, and near to the center of, the first lower platen 3b. The two clamp plates near to the other end of the aforementioned upper platen are each secured to a second lower platen contiguous with the first lower platen and thus the upper and lower platens adjacent the belting 4 are linked together in the direction of the length of the belting in addition to being secured against vertical separation.

Each clamp plate is tapered, being thicker at its free end than at its pivoted end, the sides of the lower platens 3b are formed with correspondingly tapered edges. Thus, tightening of each clamp screw firmly secures the associated clamp plate to a lower platen and substantially positively prevents platen separation. When the upper and lower platens have been pressed together at a pressing station and clamped by the clamps, the friction due to the pressure between the belt and the platens prevents longitudinal separation of the platens. If desired, however, this longitudinal separation may also be resisted by the use of clamps arranged positively to locate upper and lower platens relative to each other in a longitudinal direction.

To control the width and thickness of the portion of belting being cured and produce straight edges on the belting, two edge irons 12 in the form of metal slats having straight side edges are provided between the successive upper and lower platens and are arranged to be positioned with one edge of each iron in engagement with one edge of its respective portion of belting.

Power-operated means (not shown) is provided to force the edge irons 12 into engagement with the edges of the belting after the platens 3a, 3b have engaged the belt at the commencement of each curing operation at the first stations 25a, 25c. To maintain the separation of the edge irons and therefore to control the width of the belting throughout each curing operation, the platens are provided with locking means comprising a pair of locking pins (not shown) mounted at each side of the platens.

Each locking pin is locatable in any one of a series of apertures formed in its associated edge iron 12 at a corresponding position along the length thereof, the apertures of each series being spaced-apart across the width of the edge iron. When the edge irons have been forced to have their required separation at the first station 25a, they are maintained at this separation by locating the locking pins in the apertures in the edge irons appropriate to this separation.

Figure 1:
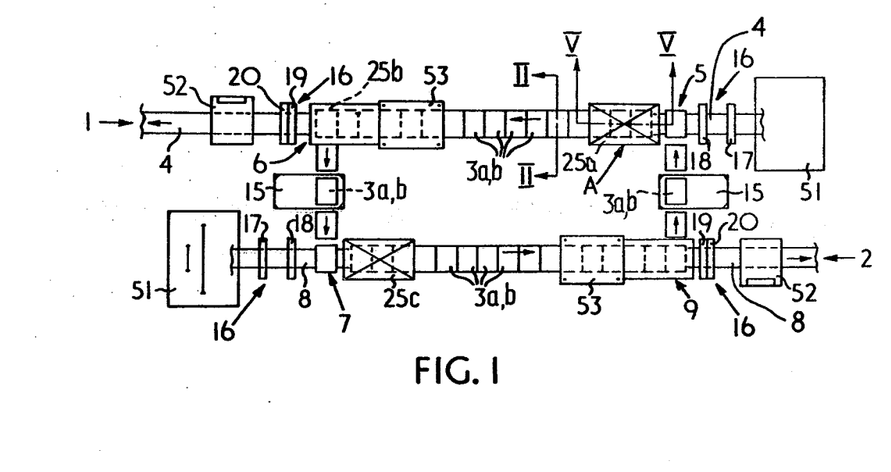
FIG. 1 shows a plan view of two curing presses.

Two iron change units 15 are provided between the two curing units 1, 2, one at each end thereof, where the edge irons associated with the platens in the curing of one belt are changed, if necessary, for those required for the other belt. Thus, if desired, the two belts 4, 8 may be of different widths and thickness.

As each belt passes through its respective curing unit, it is maintained under a predetermined steady longitudinal tensile load by means of tension units 16 located one at each end of each press. The provision of tensioning units, however, is optional.

Each tension unit 16 comprises a longitudinally fixed clamp and a longitudinally movable clamp. By engagement of the clamps with and disengagement of the clamps from the belt and movement of the movable clamps, at appropriate times, the belt and its associated chain of linked platens are moved stepwise through the curing unit under substantially constant longitudinal tension.

The longitudinally movable clamp of each tension unit is positioned on the side of its respective fixed clamp which is remote from the first and second stations, so that on passing through each curing unit, the belts being cured first encounter a first movable clamp 17, then a first fixed clamp 18 and the platens, and on leaving the curing unit in the cured state the belts pass first through a second fixed clamp 19 and finally through a second movable clamp 20.

The fixed clamps 18, 19 hold the belt under tension while it is stationary in the respective curing unit, during which time the movable clamps 17, 20 are moved to appropriate positions for the belt then to be moved longitudinally a distance corresponding to the length of one platen.

Thus, while the belt is held by the fixed clamps 18, 19 the first movable clamp 17 pre-tensions a length of uncured belting corresponding to the length of one platen and remains in engagement with the uncured belting at a position spaced from the first fixed clamp 18, and the second movable clamp 20 is positioned adjacent the second fixed clamp 19 and is engaged with the cured belting.

Finally the fixed clamps 18, 19 are disengaged from the belting and the movable clamps 17, 20, which are then maintaining the belting under tension, move longitudinally in unison by a distance corresponding to the length of one platen to bring a corresponding length of uncured belting into the press at one end, whereupon the fixed clamps are re-engaged with the belting ready for the above sequence of operations to be repeated.

To support and guide the chain of linked platens for longitudinal movement with the belting during curing, support and guide wheels are provided at spaced-apart positions along both sides of each press. The support wheels 21 (see FIG. 2) are mounted for rotation about horizontal axes parallel to the planes in which the platens 3a, 3b lie and engage support surfaces 22 extending along the length of each lower platen, one on each side thereof, whereas the guide wheels (not shown) are mounted for rotation about vertical axes and engage guide surfaces 23 also extending along the length of each lower platen one on each side thereof.

The pressing stations 25a, 25c which respectively constitute the first station of each curing unit will now be described.

Figure 4:
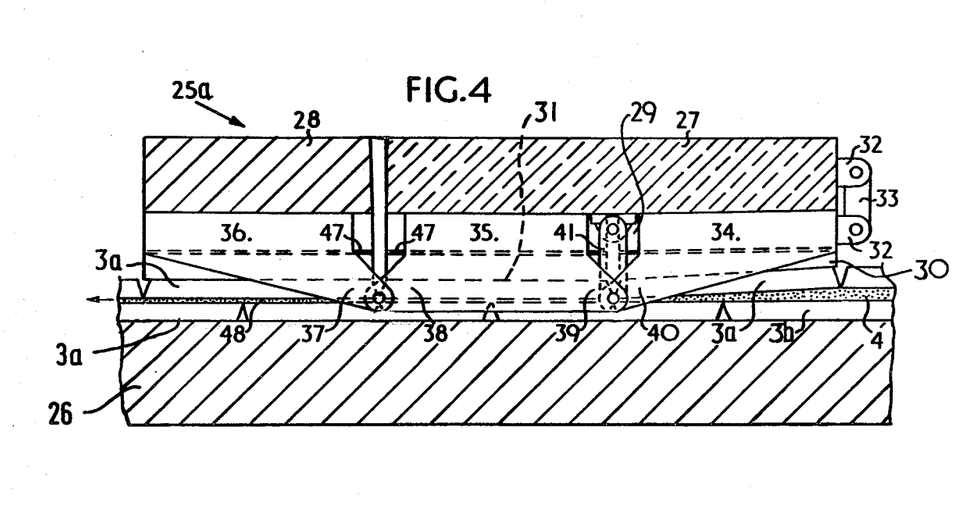
FIG. 4 shows a pressing station A in FIG. 1, in a side elevation view at right angles to a length of belting being cured.

As shown in FIG. 4, each pressing station 25a comprises thrust means for simultaneously applying pressure through three successive upper platens 3a within the pressing station to three contiguous portions of the upper surface of the belting.

The thrust means comprises a vertically movable base member, designated as a whole by the reference numeral 26 and equal in length to four platens, on which three upper platens and four lower platens are supported while in the pressing station, and first and second vertically movable press heads each designated as a whole by the respective reference numerals 27, 28. The vertical movement of the base member 26 enables it to be brought into supporting contact with the four lower platens which normally rest on their support wheels 21 (not shown in FIG. 4). So that the wheels are not subjected to the loads arising when pressure is applied to the belting in the pressing station, the supports on which the wheels 21 run when within the pressing station are arranged such that they may be lowered slightly from contact with the wheels and all of the press loading taken by the base member.

Pressure is applied to the belting within the pressing station by vertically downward movement of the press heads 27, 28.

The press heads 27, 28 are fluid-pressure operated and the first press head 27 comprises an upper tapered thrust member 29 (see FIG. 5) and first and second pressure plates 30, 31 pivotally mounted below the tapered thrust member. The second press head 28 comprises a single thrust member of thickness comparable to the combined thickness of the tapered thrust member and its associated pressure plates of the first press head.

The two press heads 27, 28 are pivotally interconnected as will be described, but are otherwise independently operable.

The manner in which the two pressure plates 30, 31 of the first press head are mounted below the upper tapered thrust member 29 and connected to the second press head 28 will now be described.

At the end of the first press head 27 at which the belt 4 enters the pressing station, the rearward end of the first pressure plate 30 is pivotally connected to the upper tapered thrust member 29 by a link joint at each side thereof, each link joint comprising two hinge members 32 one rigidly secured to the first pressure plate and the other rigidly secured to the upper tapered thrust member, and a rigid link 33 interconnecting the two hinge members and pivotally secured thereto at each end.

Three pairs of side plates, 34, 35, 36 are rigidly secured one plate to each side of the first and second pressure plates and one plate to each side of the second press head respectively.

The side plates 34, 35, 36 extend downwardly to the level of the belt 4 being cured, where they are pivotally interconnected.

The rearward ends 37 of the side plates 36 of the second press head 28 are simply pivotally connected to the forward ends 38 of the side plates of the second pressure plate 31 of the first press head 27. Thus, a downward movement of the second press head effects a similar downward movement of the forward end of the second pressure plate of the first press head.

The rearward ends 39 of the side plates 35 of the second pressure plate 31 of the first press head are pivotally connected to the forward ends 40 of the side plates 34 of the first pressure plate 30 of the first press head, and the two joints therebetween are each supported by a support arm 41 pivotally connected at one end to the two side plates 34, 35 at the joint therebetween, and pivotally connected at its other end to the upper tapered thrust member midway along the length thereof.

The length of the upper tapered thrust member 29 is twice that of one platen and its lower surface is constructed so that the thrust member tapers in thickness but not in width from its mid-point towards its rearward end. The tapered thrust member thus comprises a tapered portion 42 for engagement with the first plate 30 and an untapered portion 43 for engagement with the second pressure plate 31.

The first and second pressure plates 30, 31 respectively, positioned below the tapered thrust member 29 are each of the same length as an upper plate, so that for a given downward movement of the tapered thrust member, the second pressure platen will experience a generally uniform thrust over its whole upper surface, whereas although the first pressure plate will receive substantially the same thrust at its forward end as the second pressure plate, the thrust decreases towards the rearward end of the first pressure plate where it is comparatively small. As a result of the pivotal mounting of the said first and second pressure plates, the downward thrusts applied to the upper platens 3a below the two pressure plates correspond to the thrusts received by the two pressure plates themselves.

The second press head 28 applies a substantially uniform thrust to the upper platen 3a immediately preceding that under the second pressure plate 31.

To allow movement of the two pressure plates 30, 31 of the first press head 27, the second pressure plate may be provided (as shown in FIGS. 5 to 8) with sloping forward and rearward edges 44, 45 respectively so that the pressure plate tapers slightly in a vertical direction away from its lower surface, or the same effect may be achieved by spacing apart the second pressure plate 31 from both the second press head 28 and the first pressure plate 30, as shown in FIG. 4.

The operation of the pressing stations will now be described with reference to FIGS. 5 to 8 of the drawings.

The belting 4 and the platens 3a, 3b move stepwise through the pressing stations 25a, 25c, moving forward by the length of one platen in each step, the two press heads 27, 28 executing one complete downward movement before the belt and platens move on.

Figure 5:
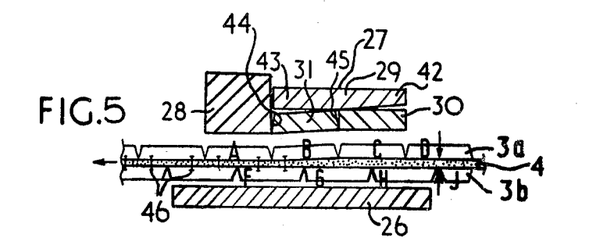
FIGS. 5 to 8 show diagrammatic cross-sectional views taken on the line V—V of FIG. 1 illustrating a sequence of movements.
Figure 6:
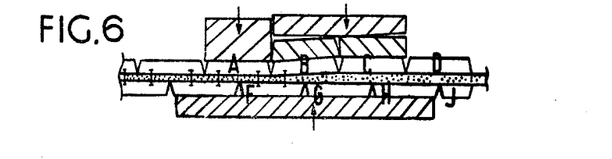

On entering a pressing station 25a (see FIG. 5) an upper platen C and its respective portion of uncured belting is compressed first between the first pressure plate 3a and portions of lower platens G and H supported by the base member 26 (see FIG. 6). This causes the belting 4 to achieve at the forward end of the upper platen C the thickness required in the fully cured belting (see FIG. 7), but at the rearward end the belting is hardly compressed, if at all.

Next, the rearward pair of clamps on platen B and the forward pair of clamps on platen C are secured to platen G. The pressing station is then opened and the belt and associated platens are moved one platen length further into the pressing station (see FIG. 8), and a further two off-set platens D, J take their place between the first pressure plate and the base member.

Figure 7:
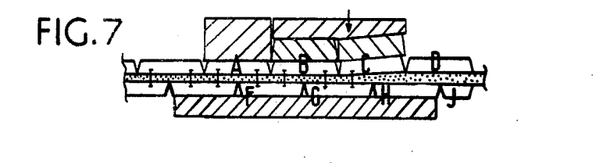
Figure 8:
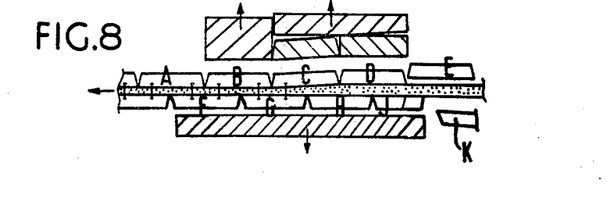

Drawings showing the upper platen C undergoing the next stage of compression in the pressing station are not provided because upper platen C is then as shown in FIG. 8, in the position occupied by the upper platen B in FIGS. 5 to 7, and undergoes the sequence of operations executed by the upper platen B in FIGS. 5 to 7. Accordingly, this next stage will be described with reference to upper platen B in FIGS. 5 to 7.

When the upper tapered thrust member is forced downwardly (as shown in FIGS. 6 and 7) the upper platen B is depressed at its rearward end substantially simultaneously with the initial exertion of compressive forces on the next following contiguous portion of belting by the forward end of the next following upper platen C.

Thus, the belting between the upper platen B and lower platens F and G is brought to its required final thickness at the stage illustrated in FIG. 7, and clamps 46 are tightened further to maintain the desired compressive forces on the belting.

On commencing curing of a length of belting, some rubber may tend to be squeezed out from the forward end of the first platen on the belt, but if this occurs the short length of affected belting can be discarded and from then onward the problem will not arise again with the remainder of that length of belting.

The second press head 28 constitutes means, independent of the tapered thrust member 29, to urge the forward end of the second pressure plate 31 towards the belting being cured, and the maintenance, when required, of compressive forces at the forward end of each upper platen is the main function of the second press head. The second press head 28 also serves to maintain uniform compressive forces over the whole area of belting under the upper platen which is engaged by the second press head at any given time. Thus, provision of the second press head allows the clamps to be of relatively light construction and to be designed to act on the platens only at the edges thereof as shown in FIG. 3. Although such clamps are adequate to maintain pressure on the belting after it has passed through the pressing station to prevent vertical separation and to link the platens in the longitudinal direction of the belting on their own, the clamps would be incapable of maintaining uniform pressure on a portion of belting when the preceding contiguous portion of belting is being compressed in a pressing station, since in such circumstances the pressure of hot fluid rubber can be sufficient to cause buckling of platens which are held together only at their edges.

Further, by holding its associated platen in firm head to tail relationship with the next following platen, the second press head 28 also assists the clamping means in preventing the longitudinally-linked staggered platens separating longitudinally under the pressure of hot fluid and thereby effectively stretching the belting.

Heat is supplied to the platens during the time that they are under compression in the pressing stations 25a, 25c so that each platen is reheated at the beginning of each curing operation.

The heat is transferred to the platens by contact with the heated portions of the thrust means. Thus certain portions of both the base member 26 and the press heads 27, 28 are continuously heated by electricity, steam, or any other convenient source of heat. The supply of heat to the two press heads and to the base member is limited to the lower portions and upper portions respectively thereof, which engage the platens. The heated portions of the press heads are insulated from the remainder thereof by insulation layers to minimize heat loss, and a similar second insulation layer is provided below the heated portion of the base member.

Heat losses from the platens on emerging from a pressing station during a curing operation are minimized by providing tunnels 49 (see FIG. 2) each having a lining 50 of insulating material. The tunnels closely surround the platens and extend along the length of their respective curing unit 1, 2, so that the platens pass therethrough during each curing operation. For clarity, the tunnels have been omitted from FIG. 1.

The supply 51 of uncured belting at one end of each curing unit may be simply in the form of a roll of uncured belting mounted for rotation on an axle, or, the curing unit may be positioned at one end of a belting production line in which case the uncured belting enters the press immediately after it has been assembled from, for example, a rubber-frictioned textile reinforcement and superimposed rubber covering layers.

On emerging from its respective curing unit the belting passes through a trim unit 52 for the removal of rubber flashing, and after cooling is ready for service.

If it is found desirable, a reheating station 53 (see FIG. 1) may be provided near the end of each curing unit to supply heat to the platens shortly before passing to the second station of the respective curing unit and being removed from the belting. Heat is supplied to the platens in the reheating stations by contact between the platens in the reheating stations by contact between the platens and heated metal blocks.

To minimize the leakage of rubber between the neighboring ends of successive platens means is provided for positively forcing the platens together in a longitudinal direction. This is achieved simply by arranging that the pivotal joints between the side plates 36 of the second press head 28 and the side plates 35 of the second pressure plate 31 of the first press head 27 are higher with respect to the base member 26 than the corresponding joints between the side plates of the two pressure plates 30, 31 of the first press head. Tightening of the clamping means while the platens are in the pressing station therefore ensures that the chain of platens leaving the pressing station are firmly linked together and that, therefore, a uniform tension is maintained in the belting while it is being cured during its passage to the second station.

In a second embodiment of the invention the curing units are arranged substantially as described in respect of the preceding embodiment except that a band of thin plastics material, for example, Melinex, is provided adjacent one surface of the belting, between the belting and the upper and lower series of platens.

The use of a plastics band adjacent a surface of a belting during curing results in a superior finish compared with that of a surface cured in direct contact with platens.

As an alternative to the use of bands of thin plastics material, the bands may, for example, be of a metal such as steel, or any other material capable of withstanding the curing temperatures.

Figure 9:
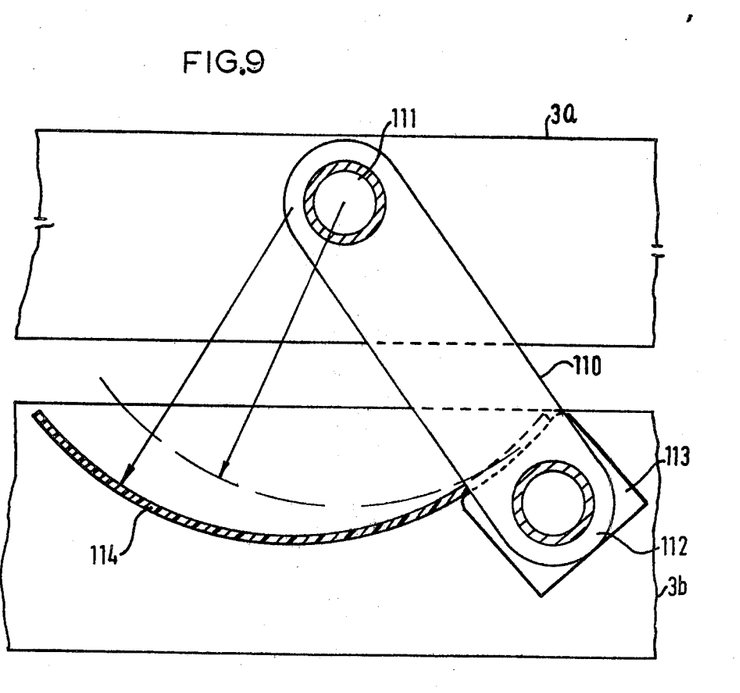
FIG. 9 shows a side view of alternative means for securing upper and lower platens relative to each other.
Figure 15:
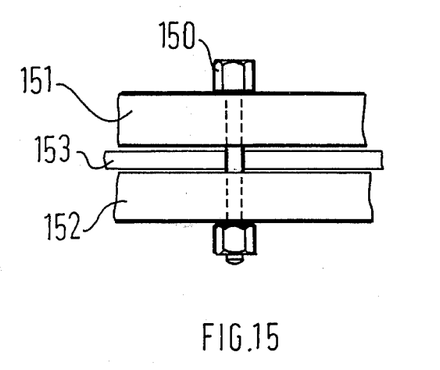
FIG. 15 shows yet another means for securing upper and lower platens.

While in the embodiment illustrated in FIGS. 1 to 8 the upper and lower platens are secured relative to each other by means of hinged clamps it is to be appreciated that any other suitable clamping or securing means may alternatively be used. The platens may, for example, be secured, as illustrated in FIG. 15 simply by means of bolts 150 extending directly through the upper and lower platens 151, 152, or may be secured as shown in FIG. 9 by means of clamp means in the form of rotatable arms 110 pivoted about spindle 111 projecting from the edges of the upper platens 3a and provided at the free end 112 with a securing block 113 pivoted relative thereto for engagement with a cam surface 114 projecting from the edge of a lower platen 3b. The cam surface may be formed from a suitable bearing material and may be of arcuate shape, the center of the imaginary circle of which the arcuate cam surface forms a part being displaced from the center of the spindle 111 and the surface being arranged such that as the securing block is moved over the cam surface the upper and lower platens 3a, 3b are drawn together.

Figure 10:
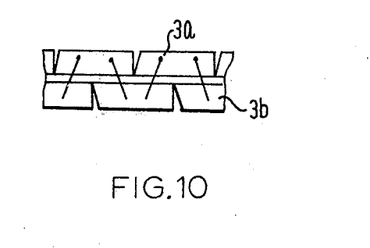
FIG. 10 shows a series of platens secured by the clamping means shown in FIG. 9.

FIG. 10 shows the manner in which a series of the clamping means shown in FIG. 9 may be used to link together the upper and lower platens 3a, 3b of a chain of platens. In particular, it will be observed that any tendency for relative longitudinal movement between the platens of the chain will tend to increase the force exerted between the upper and lower platens by the clamping means and thereby increase the grip of the platens on the belt material therebetween. It will also be observed that since the center of the imaginary circle of which the cam surface forms a part is displaced, in the manner shown, relative to the center of the spindle the clamping means can effectively be used, without any adjustment, to clamp belts having a range of thicknesses.

Figure 11:
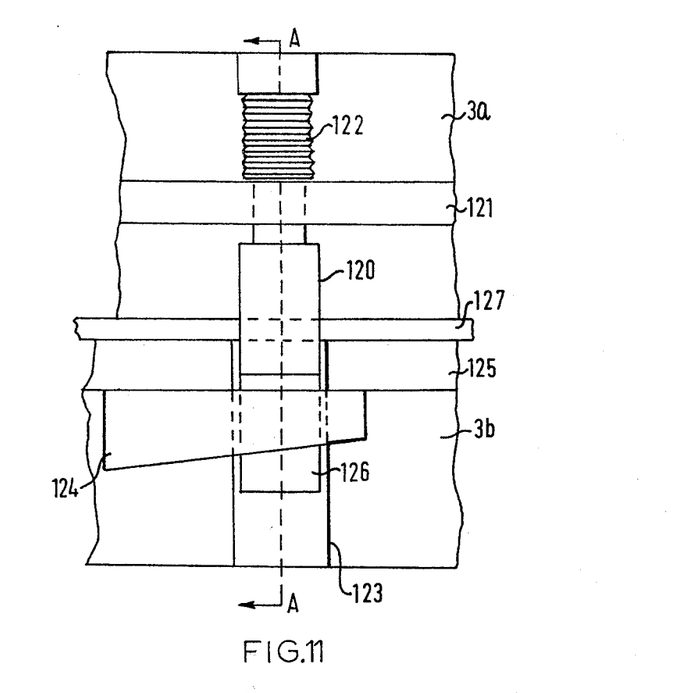
FIG. 11 shows a side view of further means for securing upper and lower platens relative to each other.
Figure 12:
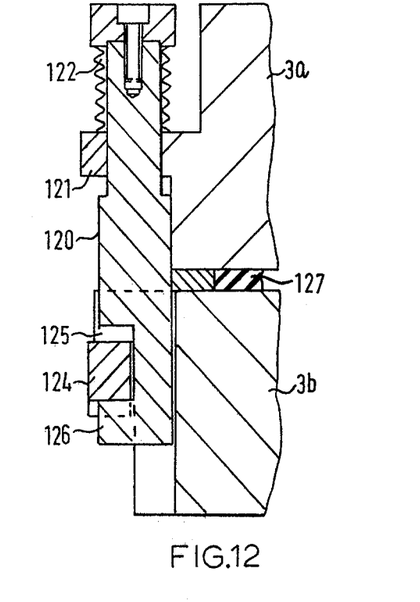
FIG. 12 shows a sectional view on the line A—A of FIG. 11

Another arrangement of clamping means is shown in FIGS. 11 and 12 of the accompanying drawings. Locking bars 120 extend through shoulders 121 formed at the edges of the upper platens 3a and are spring-loaded relative thereto by means of dished springs 122. The locking bars extend at their lower ends alongside the lower platens 3b, running within guide channels 123 formed at the edges of the lower platens, and wedges 124 may be inserted between shoulders 125 formed at the edges of the lower platens and projecting portions 126 at the lower ends of the locking bars in order to draw the upper and lower platens towards each other. This particular arrangement has the advantage that in general no special adjustment is necessary to the clamping means when the thickness of belt 127 being cured is changed, a wedge of suitable shape and size being able to cater for a range of belt thicknesses.

Figure 13:
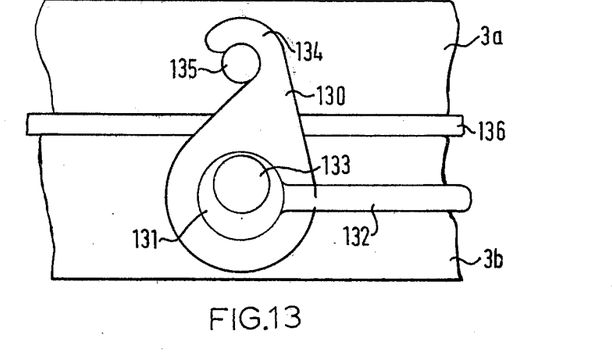
FIG. 13 shows a side view of another means for securing upper and lower platens relative to each other.

FIG. 13 shows a further form of clamping means, comprising a clamping hook 130 rotatable about a circular formation 131 at one end of an operating arm 132, said circular formation itself being pivoted about a spindle 133 projecting from a lower platen 3b, and the axis of rotation of the operating handle about the spindle being displaced relative to the center of the circular formation. The end of the clamping hook furthest from the spindle 133 is formed with a hook portion 134 shaped to locate around a spindle 135 extending from the side of an upper platen 3a. In operation of the clamping means rotation of the operating arm may either cause the hook portion to be pulled down onto the spindle 135 and thereby draw the upper and lower platens together with the belt material 136 therebetween or cause the hook to lift clear of the spindle and permit separation of the upper and lower platens.

Figure 14:
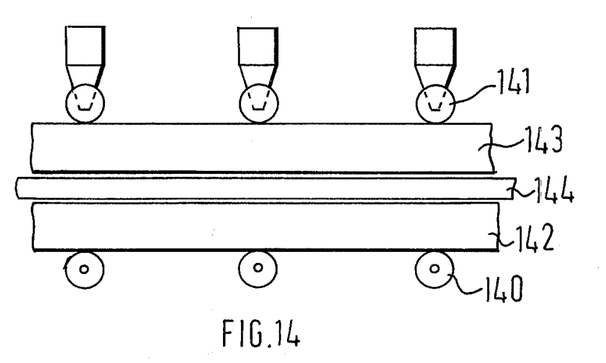
FIG. 14 shows a side view of another means for securing upper and lower platens relative to each other.

In another arrangement illustrated in FIG. 14, a series of rollers 140, 141 are provided adjacent both the upper and lower platens 142, 143 to assist in retaining the platens in the desired positions relative to each other, the of rollers 141 may be loaded by hydraulic or other means to assist in maintaining a predetermined pressure on material 144 in the curing press between the upper and lower platens.

The present invention facilitates the manufacture of improved elongated articles, such as mechanical belting, since the linked chain of staggered platens enables a uniform tension to be maintained in the article as the article and platens in curing association therewith are moved in a stepwise manner through the curing unit. The platens adjacent one surface of the article may each be secured to two successive platens adjacent a second surface by the use of clamping means, such as have been hereinbefore described, to link the platens in a longitudinal direction as well as to prevent vertical separation of the platens. The longitudinal staggering and linking of the platens has the particular advantage that, compared with curing units in which pairs of platens are vertically aligned and are linked together merely by the belt, the belt material is not stretched between platens during stepwise movement through the curing unit and an improved belt having a superior surface finish is produced.

A particular feature associated with the use of platens in the manner described is that the platens are moved into contact with the surface of the uncured belt material in a direction perpendicular thereto and thus as compared with conventional methods in which uncured material is dragged into position over stationary curing surfaces, the present method obviates any tendency for scuffing and degradation of the surface of the material to be cured as it is brought into contact with the heated curing surface.

The use of pressing stations of the kind described, in which pressure is increased progressively along a portion of uncured belt as a platen is applied thereto, is found to have the advantage of allowing any excess material between the upper and lower platens to flow back in the direction of the uncured material. Thus the length of the cured belt, in the case of only a nominal shrinkage rate in a belt not having an excessively strong longitudinal reinforcement, will generally be greater than the length of the uncured material, and since only little material will be wasted at the edges of the belt during compression and curing, good use is made of the uncured material and the pressing operation is in this respect efficient in the use of said material. Additionally, since neighboring platens may be held firmly in abutting relationship such that no material can exude between neighboring platens, there is no significant loss of material at this point and also the achievement of a superior surface finish is further assisted. A steel or plastics band may be provided adjacent one or more of the surfaces of the article, between the article and curing platens, to ensure a high quality surface finish.

Having now described my invention, what I claim is:

1. A curing press for curing elongated articles comprising platens to be brought into curing relationship with successive portions of two surfaces of an elongated article to be cured, with the platens adjacent a first surface staggered relative to those adjacent a second surface in the direction of the length of the article, securing means for detachably securing together the staggered platens to prevent longitudinal separation of the platens, stepwise transfer means arranged to move the article and a plurality of platens in curing relationship therewith in a stepwise manner in the direction of the length of the article, and means for causing the platens to apply compressive forces to successive portions of the article while stationary between successive stepwise movements.

2. A curing press according to claim 1 wherein a pressing station is provided to cause the platens to apply compressive forces to their respective portions of the article, the securing means also acting as clamping means to retain the platens relative to each other when the platens leave the pressing station.

3. A curing press according to claim 2 wherein the platen securing means are arranged such that each platen adjacent a first surface of the article may be secured to two successive platens adjacent a second surface of the article.

4. A curing press according to claim 2 wherein each securing means comprises a clamp plate, arranged to pivot relative to an associated platen about an axis parallel with the longitudinal direction of the curing press, and securable relative to another platen by fastening means.

5. A curing press according to claim 4 wherein the clamp plate is tapered, being thicker at its free end than at its pivoted end, and the sides of the platen to which it is securable are formed with correspondingly tapered edges such that platen separation is substantially positively prevented.

6. A curing press according to claim 2 wherein each securing means comprises a clamp plate in the form of a rotatable arm arranged to pivot relative to an associated platen and engageable with a cam surface of another platen.

7. A curing press according to claim 2 wherein each securing means comprises a locking bar associated with a first platen and securable relative to a second platen by means of a wedge.

8. A curing press according to claim 1 wherein series of rollers are provided adjacent upper and lower platens.

9. A curing press according to claim 8 wherein at least some of the rollers are hydraulically loaded.

10. A curing press according to claim 2 wherein the securing means comprises a clamping hook rotatably mounted relative to a first platen and formed with a hook portion for engagement with a second platen, the clamping hook being eccentrically mounted relative to the first platen by means of an operating arm rotatable to bring the clamping hook into and out of engagement with the second platen.

11. A curing press according to claim 1 wherein upper and lower platens are secured relative to each other by means of bolts extending through the platens.

* * * * *